United States Patent
Andresen et al.

(10) Patent No.: US 9,307,202 B2
(45) Date of Patent: Apr. 5, 2016

(54) APPARATUS AND METHOD FOR CREATING SITUATION AWARENESS WHEN SCHEDULING CONFERENCE CALLS

(71) Applicant: Cisco Technology, Inc., San Jose, CA (US)

(72) Inventors: Simen Andresen, Akershus (NO); Ivan Kristiansen, Akershus (NO); Cato Rotevatn Nyberg, Akershus (NO); Hallgrim Sagen, Akershus (NO)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/503,899

(22) Filed: Oct. 1, 2014

(65) Prior Publication Data

US 2015/0015662 A1    Jan. 15, 2015

Related U.S. Application Data (63) Continuation of application No. 13/536,498, filed on Jun. 28, 2012, now Pat. No. 8,878,893.

(60) Provisional application No. 61/534,557, filed on Sep. 14, 2011.

(51) Int. Cl.
  *H04N 7/14* (2006.01)
  *H04N 7/15* (2006.01)

(52) U.S. Cl.
  CPC . *H04N 7/15* (2013.01); *H04N 7/147* (2013.01)

(58) Field of Classification Search
  CPC ....................................................... H04N 7/14
  USPC .................... 348/14.01, 14.07, 14.03, 14.08; 455/404.2, 456.1
  See application file for complete search history.

(56) References Cited

U.S. PATENT DOCUMENTS

| | | | |
|---|---|---|---|
| 6,716,101 B1 * | 4/2004 | Meadows et al. | 455/456.1 |
| 7,356,137 B1 * | 4/2008 | Burg et al. | 379/211.01 |
| 8,301,174 B2 * | 10/2012 | An | 455/457 |
| 8,458,321 B2 * | 6/2013 | Agulnik et al. | 709/224 |
| 2002/0168997 A1 * | 11/2002 | Katagishi et al. | 455/550 |
| 2006/0063539 A1 * | 3/2006 | Beyer | 455/456.3 |
| 2007/0024453 A1 * | 2/2007 | Mohammed et al. | 340/573.4 |
| 2007/0070186 A1 * | 3/2007 | Fujimori | H04N 7/15 348/14.03 |
| 2008/0132243 A1 * | 6/2008 | Spalink et al. | 455/456.1 |
| 2009/0010419 A1 * | 1/2009 | Toebes et al. | 379/265.03 |
| 2010/0077018 A1 * | 3/2010 | Acharya et al. | 709/203 |
| 2010/0260327 A1 * | 10/2010 | Ray | 379/93.23 |
| 2011/0264615 A1 * | 10/2011 | Rajan et al. | 706/47 |
| 2013/0109361 A1 | 5/2013 | Felt | |

\* cited by examiner

*Primary Examiner* — Olisa Anwah
(74) *Attorney, Agent, or Firm* — Lempia Summerfield Katz LLC (57) ABSTRACT

A method for creating situation awareness when scheduling video conferences includes providing a user with access to a set of names stored in a directory service database, and allowing the user to select one or more of the names. In response to selection of one or more names, geographical location values associated with the names in the directory service database are retrieved, and a map is provided. The map and one or more geographical objects showing the geographical location of the users associated with the selected names is then displayed on a display.

22 Claims, 4 Drawing Sheets

APPARATUS AND METHOD FOR CREATING SITUATION AWARENESS WHEN SCHEDULING CONFERENCE CALLS

CROSS-REFERENCE TO RELATED APPLICATIONS

The present application is a continuation under 37 C.F.R. §1.53(b) and 35 U.S.C. §120 of U.S. patent application Ser. No. 13/536,498 entitled "Apparatus and Method for Creating Situation Awareness When Scheduling Conference Calls" and filed Jun. 28, 2012, which is based upon and claims the benefit of priority from U.S. Application No. 61/534,557 entitled "Apparatus and Method for Creating Situation Awareness When Scheduling Conference Calls" and filed Sep. 14, 2011; and claims the benefit of priority under 35 U.S.C. §119 from Norwegian Patent Application No. 10 20110927 filed Jun. 28, 2011. The contents of these documents are incorporated herein by reference.

TECHNICAL FIELD

The present disclosure relates generally to creating situation awareness when scheduling video conferences

BACKGROUND

Conventional video conferencing systems include a number of terminals communicating real-time video, audio and/or data (often referred to as duo video) streams over and between various networks, such as packet switched networks and circuit switched networks. Video conferencing terminals typically include a camera, a microphone, a loudspeaker and a screen. The audio stream and video stream from the microphone and camera respectively, is compressed and sent to one or more receiving sites in the video conference. All sites in the conference receive live video and audio from the other sites in the conference, thus enabling real time communication with both visual and acoustic information.

In a video conference, the participants may be located in different parts of a country; in different parts of a continent or even on opposite parts of the world. Even though two users in a video conference are geographically separated by thousands of miles, they experience it as if the other user is in the same room. Hence, the use of telecommunication equipment, such as video conference, liberates us from the limitations of time and space. A user does not need to travel 11 hours from Paris to San Francisco to conduct a meeting. However, the danger is that when we no longer need to worry about travel arrangements, it is easy to forget that the other party to a conference operates in a different time zone.

BRIEF DESCRIPTION OF THE DRAWINGS

Aspects of the disclosure will be apparent from the following description of exemplary embodiments, as illustrated in the accompanying drawings in which like reference characters refer to the same parts throughout the different views.

DESCRIPTION OF EXAMPLE EMBODIMENTS

Overview

A computer-implemented method for creating situation awareness when scheduling video conferences includes providing a user with access to a set of names stored in a directory service database. The method also includes receiving a user action designating one or more names in the directory service database as selected. In response to one or more names being designated as selected, the method retrieves geographical location values associated with the one or more names in the directory service database. A visual representation of at least a part of the Earth's surface is provided, and the geographical location values are mapped to corresponding locations on the visual representation. The visualization representation and one or more graphical objects are then displayed on a display such that the graphical objects visualize the locations on the visual representations.

Figure 1:
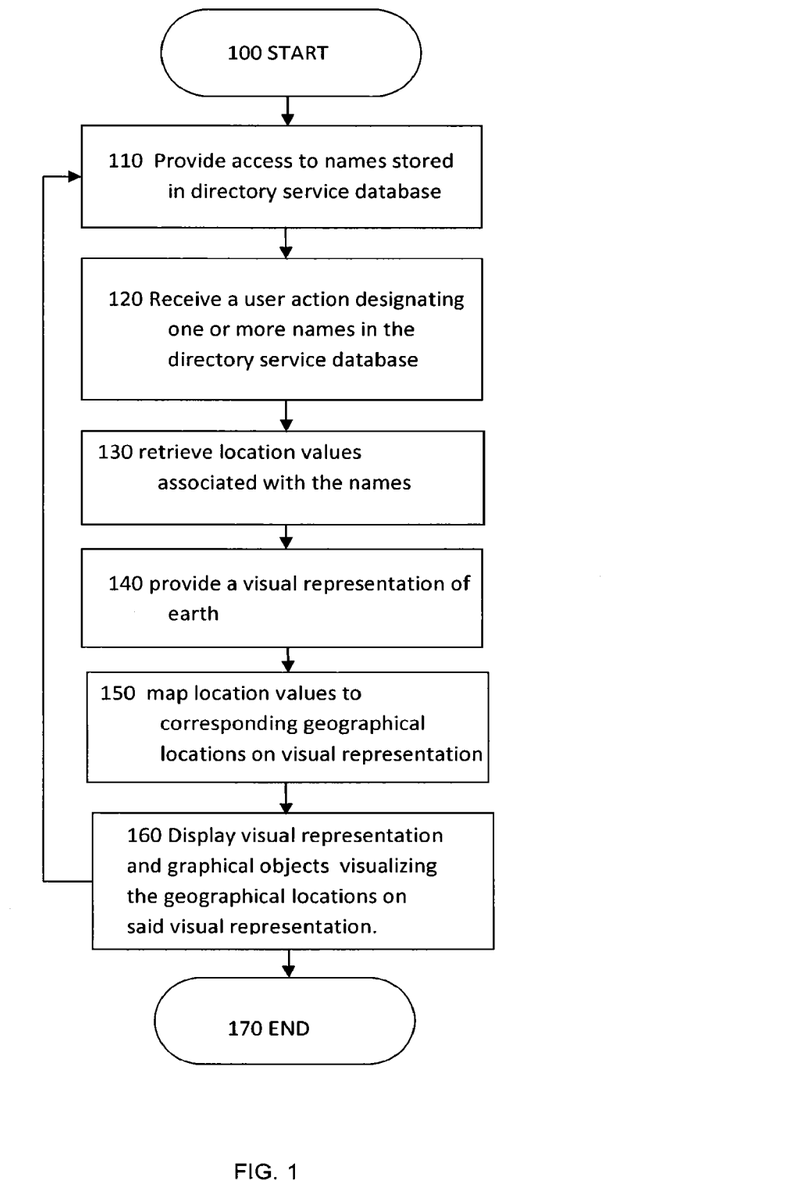
FIG. 1 illustrates a schematic flow chart of a method according to exemplary aspects of the disclosure.

FIG. 1 illustrates a flowchart of the principle of an exemplary method for creating situation awareness when scheduling video conferences. The method starts at the initiating step 100. In step 110, a user is provided with access to a set of names stored in a directory service database. This may be accomplished by providing, on a display to be viewed by the user, a graphical user interface (GUI). The graphical user interface includes a user interface to at least a directory service. In an exemplary aspect, the directory service may include a phone book service, and the directory service database may be a phone book.

The GUI is provided at a local video conference endpoint and is displayed on a display associated with the local video conferencing endpoint. For example, the local video conferencing endpoint may be a desktop terminal, a meeting room terminal, a telepresence system or a video conferencing software client running on a personal computer (in which case the computer's display will display the GUI). The GUI may also be used to control other features, such as the operation of the video conference functions of the video conference endpoint.

The GUI may also be provided by a Video conference management system (VCMS) for administrating a number of video conferencing resources (such as endpoints, MCUs, gateways, etc.) and scheduling conferences. In this aspect the VCMS may be separate from the video conferencing endpoints participating in the video conference to be scheduled. A user may interface with the VCMS via a personal computer connected to a computer network, such as a web browser based graphical interface or a dedicated client application.

The GUI may be generated on predefined events (e.g. exiting standby mode, on startup, etc.) or as a response to a user's input, e.g., the user presses a button on a keypad, keyboard or remote control, or touches a touch screen panel associated with a video conferencing endpoint. The graphical user interface efficiently enables the user to readily access or enter contact information for other conference endpoints or users.

Figure 2:
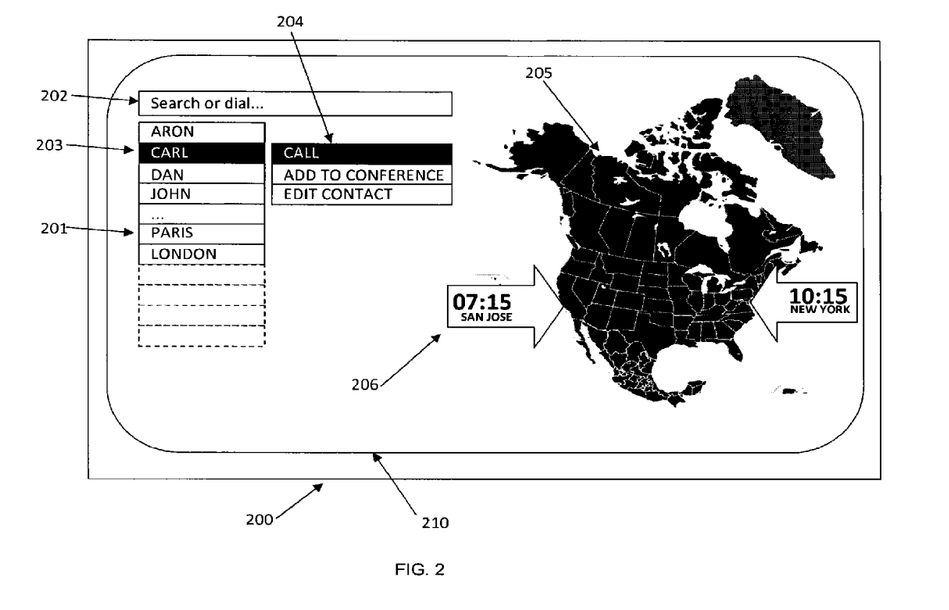
FIG. 2 illustrates a schematic block diagram of the result of the method according to the exemplary aspects of the disclosure.

As illustrated in FIG. 2, the directory service or phone book service provides access to a set of names 201 stored in a directory service database or a phone book database. A directory service, which in an aspect may be a phone book service, is a software system that stores, organizes and provides access to information in a directory service database. The directory service may be a naming service, mapping the names of network resources to their respective network addresses. With the name service type of directory, a user doesn't have to remember the physical address of a network resource, and providing a name will locate the resource. Each resource on the network is considered an object on a directory service database. Alternatively, the directory service may be a naming service, mapping the names of users to their respective associated network resources and their network addresses. In which case, each user on the network is considered an object on a directory service database. Information about a particular object is stored as attributes of that object.

Each user on the network may be considered an object on the directory server database or user database. Information about a particular user is stored as attributes of that object. The attributes may include, but are not limited to: user ID (or name), one or more endpoint addresses (IP-address and/or URI) or dial-up numbers (multimedia endpoints, handheld devices, cell phones, etc.), a geographical location value, etc and optionally a list of prioritized endpoint addresses, for each user.

The directory service or phone book service may provide access to the set of names in the form of one or more lists. The list may comprise all the names in the database in a sorted manner, e.g., alphabetized by last name or first name, or the list may be a subset of the database based on access level or group affiliation. The list may be searchable via a search field 202. The directory service or phone book may also provide access to the set of names via a dial field 202. The dial field is provided for entering the network address for the resource (endpoint apparatus) the user wishes to connect to, e.g. a Uniform Resource Identifier (URI) or a dial-up number or an IP address. The search field and the dial field may be the same field or separate fields. The user may enter letters and/or numbers of the network address in the dial/search field, and as the local user enters letters and/or numbers in the dial field the directory service updates a list of names associated with resources in the directory service database where parts of network address matches the sequence of entered letters and/or numbers.

The graphical user interface is provided on a display associated with an endpoint apparatus or a personal computer. In one exemplary aspect the GUI is displayed on a display in a remote control device associated with said endpoint apparatus 12, such as a touch screen.

According to one exemplary embodiment, the endpoint apparatus is a video conference endpoint having a main display for displaying video received from one or more remote video conference endpoint. According to this exemplary embodiment the GUI may be displayed on the main display.

Alternatively, the graphical user interface is a web interface for controlling a Conference management server (CMS), such as a Video conference management server (VCMS). A CMS is a management server running software for managing endpoint apparatuses and network components, and scheduling and initiating conferences between two or more audio conference devices or video conference devices.

Next, in the user action receiving step 120, a user action designating one or more names in the directory service database as selected is received.

In one exemplary aspect, the user action includes selecting a name from a displayed list using an input device, e.g. touch screen display, mouse, keypad, etc. In a touch screen environment the user touches a name in the list. In a non-touch screen environment, the user navigates to a name in the directory service or phone book using the appropriate navigation input device.

In another exemplary aspect, the user action is entering alphanumerical characters in the search/dial field. A name may be considered designated as selected when a local user has entered sufficient alphanumerical letters in the dial-up field 202 in the directory service for the directory service to uniquely identify one user or resource (or object) in the directory service database.

In a further exemplary aspect a name is considered designated as selected when the user has interacted with a name in the list, e.g. by touching the name in a touch screen environment or navigated to a name via a input device and then issuing a command, for instance by pressing a button, e.g. an "enter" button, arrow button, etc.

A name may also be considered designated as selected when a name in the list have been highlighted (illustrated at 203) a predetermined period of time, typically 0-10 seconds. A menu, comprising e.g. phone book or directory service listings, in a graphical user interface (GUI) is usually navigated by a mouse cursor, arrow keys or via a touch screen. When navigating through the elements of the menu, the current position in the menu or submenu is often shown by highlighting 203 a menu element (e.g. a name in a directory service listing).

The directory service may provide a list of alternative actions when a user has interacted with a name in the list. The directory service/graphical user interface may display a menu of sub-actions, illustrated at 204, that can be activated for a name; e.g. call (or initiate multimedia session), add to conference, edit before call, add to speed dial, etc. A name may be considered designated as selected when the user has selected a sub-action associated with a name in the directory service.

Next is the retrieve geographical location step 130. In response to one or more names being designated as selected, geographical location values associated with the one or more names are retrieved from the directory service database.

In one exemplary aspect the geographical location values associated with the one or more names being designated as selected and with the local endpoint apparatus (or object associated with the local endpoint apparatus) are retrieved, hereinafter referred to as all geographical location values.

In another exemplary aspect the directory service requests the graphical location values from the directory service database. The directory service database may also send a geographical location value associated with a name (or object) to the directory service when a name is designated as selected.

Each user on the network may be considered as an object in the directory service database. Information about a particular user is stored as attributes of that object. Each object has a geographical location value identifying the geographical location of said object. The geographical location value may be a geographical syntax (e.g. city, state, country or address, city, state, country) or a geographical coordinate (e.g. Latitude-Longitude-Height, ECEF, Universal Transverse Mercator (UTM), Military Grid Reference System (MGRS), etc.), or both.

In one exemplary aspect the geographical location value may be static, and only updated manually by a user or administrator via a system interface.

In another exemplary aspect the geographical location value may be dynamic, and automatically updated by a presence server or application monitoring user activity at various devises and/or monitoring devices associated with an object/user. For example, if the presence data from the users stationary desktop multimedia endpoint indicates that the endpoint has not been used in some time, and that the user's laptop computer has been used recently and the location of the laptop is Bangalore in India, and that the users cell phone is currently connected to a node in Bangalore in India, the presence logic determines that the user is currently located in Bangalore India. The presence server updates the geographical location attribute in the directory service database to Bangalore, India.

If an object does not have a geographical location attribute value (no location registered for that user or endpoint), a geographical location may be provided by determining the geographical location based on IP address, dial-up number or URI associated with the name. Geographical location may be determined using IP address or dial-up number geolocation technology. Geolocation in general is the practice of determining the physical, real world location of a person, device or subject matter using digital information processed through the Internet or other electronic means of communication. Determining the nation of an Internet user based on his or her IP address is relatively simple and accurate (95-99 percent) because a country name is required information when an IP range is allocated and IP registrars supply that information for free. Determining the physical location down to a city or ZIP code, however, is more difficult and less accurate because there is no official source for the information, users sometimes share IP addresses and Internet service providers often base IP addresses in a city where the company is basing operations. Accuracy for city information is still 50-80 percent. There are several known methods for geolocation and several commercial geolocation service providers.

A visual representation of at least parts of the earth's surface is provided in step 140. This step may include reading one or more image files or media files from a memory, register, online map database or other suitable storage space.

In one exemplary aspect a visual representation of the entire earth's surface is provided.

In another exemplary aspect a visual representation of a part or parts of the earth's surface is provided. Based on the geographical location values retrieved in step 130, the visual representation represents a geographical entity which encompasses all the geographical locations is provided in step 140. In a particular aspect, the smallest geographical entity which encompasses all the geographical locations may be determined as the geographical entity. A geographical entity may be, but is not limited to, one of the following; world, continent, region, country, state, province, district, municipality, county, city, building, etc.

Next, in step 150, the geographical location values are mapped to corresponding locations on said provided visual representation.

Figure 3:
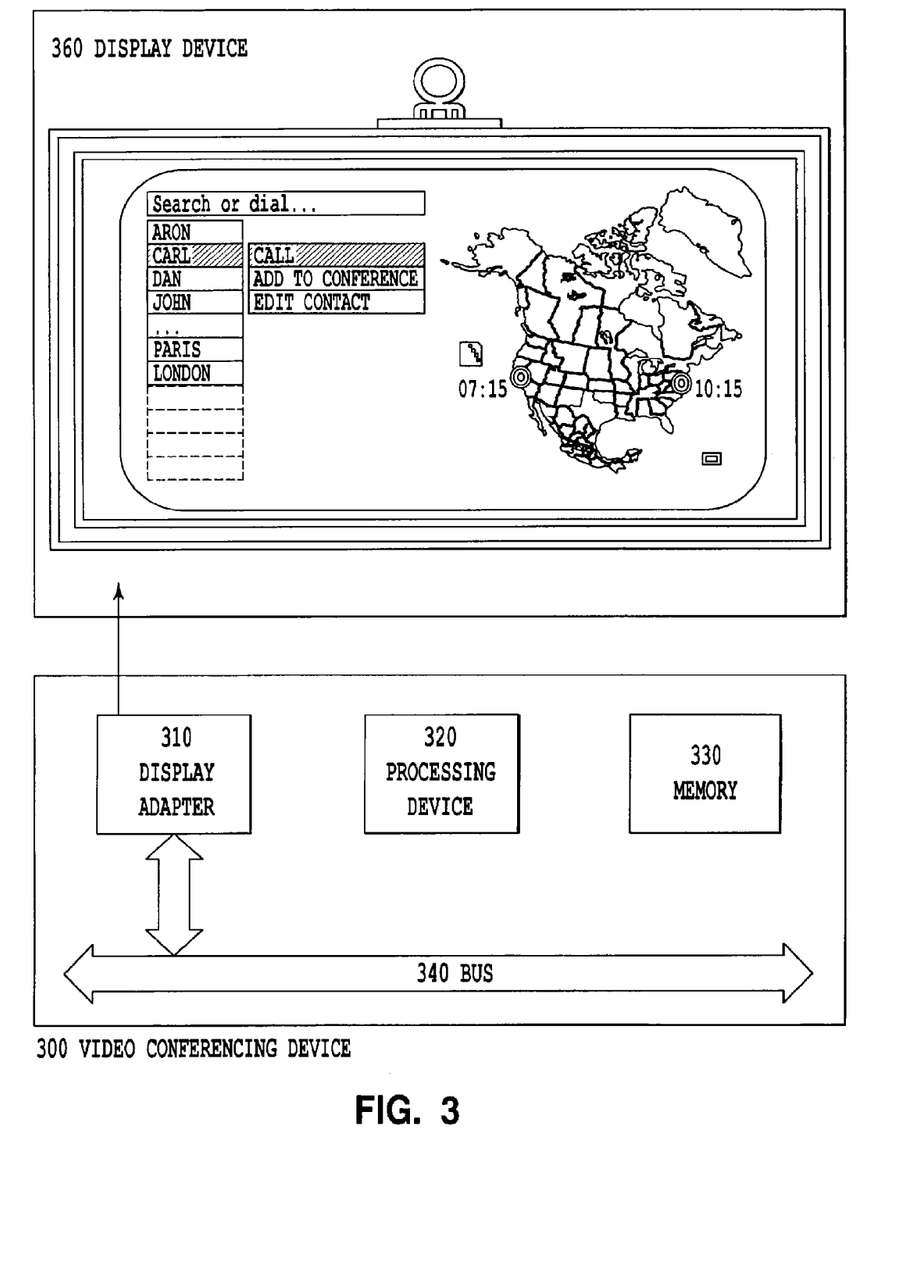
FIG. 3 illustrates a schematic block diagram of a video conferencing device according to exemplary aspects of the disclosure.

Next, in display step 160, the visual representation 205 and one or more graphical objects 206 is displayed on the display device 360. The graphical objects 206 visualize the geographical locations associated with the one or more designated names on the visual representation.

The visual representation and/or the graphical objects may be static image elements or dynamic/variable image elements, e.g. in the form of animations.

In one aspect the graphical objects is a marking or highlighting of the corresponding geographical location of the user and/or endpoint apparatus on the visual representation. The marking may include marking the locations of the users and/or endpoint apparatuses on the visual representations with a marker, such as a pin, a circle, a cross, an arrow etc.

In one aspect the graphical objects comprises data related to the retrieved locations. The data may be displayed in the form of graphics, text, or both. The geographical objects may for example comprise text indicating the location (such as city, area, country, etc) or the local time at the marked location. The highlighting may comprise changing the color, contrast, content, brightness, etc of a limited area around a geographical location in the visual representation.

The data may be presented on top of the visual representation, or on either side of the visual representation. In one exemplary embodiment the graphical objects comprise local time of all the determined location. In another exemplary embodiment the data is displayed in the form of a daylight graphics showing the pattern of night and day overlaid on the visual representation of the earth together with markings of all geographical locations. The latter exemplary embodiment allows a user to see at a glance whether it is daytime or nighttime at the various selected users locations. Travel, cost and/or environmental information may also be displayed, allowing the user to get an estimate of the different impacts this meeting would incur if they were to meet in person (e.g., Total air fare cost and carbon emissions, total business time lost due to travelling, additional cost due to required hotel accommodations and meal compensations, etc.)

In another exemplary aspect the marking or highlight is modified in accordance with parts of the data. Marking and/or highlight may have different appearance depending on local time information. In one exemplary embodiment, at predefined time intervals, marks or highlights are associated with a unique appearance. The time intervals may be default values editable by an administrator, or the time intervals may be set by each user and stored in the directory along with the other attributes for each object (or user). The latter allows users to customize the system to give a more realistic environment (some people like to work outside normal business hours due to e.g. rush traffic). For example, multimedia endpoints and/or users having a local time outside normal business hours (e.g. time interval 5 pm to 9 am) are marked with a red color, while multimedia endpoints and/or users having a local time within normal business hours (e.g. time interval 9 am to 5 pm) are marked with a green color. Further, multimedia endpoints and/or users having a local time bordering to normal business hours may be marked with a orange color (e.g. time intervals 7 am to 9 am, and 5 pm to 8 pm).

In one exemplary aspect the visual representation and one or more graphical objects are displayed on a display connected to the video conferencing unit, such as the main display or a display on a remote control associated with the video conferencing unit.

The visual representation and one or more graphical objects may also be displayed in association with the phone book or directory service, or on a part of the screen not occupied by the phone book or directory when a names is designated as selected in the phone book or directory service. This allows the local user to view the actual location and time zone of the user or multimedia endpoint he or she is currently considering to call or add to the conference.

In another exemplary aspect the visual representation and one or more graphical objects are displayed after the local user has initiated a multimedia session with one or more selected names or after the local user has added one or more names to the conference but not yet initiated a multimedia session. When a local user selects a name in the phone book or directory service, the graphical user interface displays a menu of options. The menu of options may include, but are not limited to, the option to: call the user (or initiate a multimedia session), add to a conference (where the user or multimedia endpoint is added to a list of participants to participate in a conference when the conference is initiated by the local user), edit before call, save to my contacts, etc.

If the local user initiates a multimedia session with one or more selected names, the establishment of the multimedia session may be delayed by a predefined time period and at least parts of the visual representation and one or more graphical objects are displayed during the delay time period.

This allows the local user to view the geographical locations of the users or multimedia endpoints associated with the selected names, and optionally additional information such as local time or the other user or multimedia endpoint. The local user may abort the call during the delay time period if the time and place in the remote location is inappropriate.

The exemplary method may be performed by a processing device included in a video conferencing device.

For example, the method may be implemented as a set of computer-readable processing instructions or computer program instructions, which may be tangibly stored in a memory or other computer-readable medium. The set of processing instructions causes an appropriate device, such as a video conferencing device, to perform the described exemplary method when the instructions are executed by a processing device included in the device.

FIG. 3 is a schematic block diagram illustrating an exemplary video conferencing device 300, that operates in accordance with the exemplary method described above. The video conferencing device 300 includes a processing device 320, a memory 330, a display adapter 310, all interconnected via an internal bus 340, and a display device 360. The display device 360 may include one display screen or a set of display screens, such as two or three adjacent display screens. The display device 360 may also be a display on a remote control device associated with the video conferencing device 300, e.g a touch screen display.

The illustrated elements of the exemplary video conferencing device 300 are shown for the purpose of explaining aspects of the disclosure. Thus, on of ordinary skill in the art will recognize that additional elements may be included in an actual implementation of a video conferencing device.

The memory 330 includes processing instructions which enable the video conferencing device to perform appropriate, regular video conferencing functions and operations.

Additionally, the memory 330 includes a set of processing instructions as described above with reference to the exemplary method illustrated in FIG. 1. These processing instructions when executed by the processing device 320 causes the video conferencing device 300 to perform the exemplary method for creating situation awareness when scheduling video conferences.

Additionally, the memory 330 includes one or more visual representation of the earth, or one or more sets of visual representations of the earth. The visual representation may be a geographic map, a contour map, a pictorial map, or any other way of artistically depicting the landmasses of the earth and their relative positions using drawing tools or real images of the earth's surface. The visual representation may be two dimensional or three dimensional (three dimensions in this context refers to also illustrating height above sea level). The visual representation may be a geometrically accurate (or approximately accurate) representation, or the visual representation may not be geometrically accurate but still conserve the characteristics of continents and countries such that a person with ordinary geographical skills may recognize them. The geo mapping unit may comprise a visual representation in a three dimensional global view (globe version) and in a two dimensional projection view (traditional map version). The geo mapping unit may comprise sets of visual representations, wherein each visual representation in a set have different scales or resolutions (or detail level), allowing for zooming in and out on certain areas. Alternatively, one set of visual representation is user with sufficient resolution or having vector information, allowing for zooming without deteriorating the quality when zooming. Further, the geo mapping unit may have a mapping tool for mapping geographical location (such as cities, addresses, map coordinates, etc.) to the correct corresponding location on the visual representation.

Additionally, the memory 330 may include a directory service database or user database as described above. Alternatively, the directory service database may be installed on a network server, such as in an Intranet of a corporation. Directory service databases for larger groups, such as entire countries or entire continents, may be installed in the internet (an IPN) by a service provider. Directory service database may constitute a portion of Video conferencing network device, such as a multipoint control unit, a multimedia endpoint, video conferencing management server, etc. The directory service database is administrated by an administrator, and each user may have access to edit at least some of its own user attributes (object attributes). Users may edit the attributes (or user parameters) using a software application on a personal computer or a multimedia endpoint. A directory service database on a local memory 330 may be updated on predefined events from a directory service database on a network server.

In one aspect of the disclosure, the directory server or user database further comprises an optional presence server. The presence server may have a user profile for each user in the directory server or user database. The presence server may receive or request presence data from a set of devices associated with the user. For example, a user may be associated with a cell phone, a laptop computer running a multimedia endpoint client and a office desktop multimedia endpoint. The devices may periodically send presence data to the presence server. The presence data may also be requested by the presence server or sent from a device whenever changes occur. The associated devices may or may not include an application for exchanging the presence data. The presence data may comprise, but is not limited to: keyboard, keypad or number pad activity, location based on IP address or closest cellular network node, manual settings by the user, time zone information, calendar information, etc. A presence logic in the presence server analyzes the presence data received from a user's associated devices, and determines a probable location for the user. The presence server then updates the location attribute for the user in the directory server or user parameter in the user database. For example, if the presence data from the users stationary desktop multimedia endpoint indicates that the endpoint has not been used in some time, and that the user's laptop computer has been used recently and the location of the laptop is Bangalore in India, and that the users cell phone is currently connected to a node in Bangalore in India, the presence logic determines that the user is currently located in Bangalore India. The Presence server updates the location attribute in the directory server or location user parameter in the user database to Bangalore, India.

FIG. 2 is a schematic block diagram illustrating principles of the result of the exemplary method.

A display screen 200 included in or connected to a videoconferencing device, such as a video conferencing endpoint, or a video conferencing endpoint of the software client type, is arranged in front of a local conference participant. Alternatively, display screen 200 may be a computer screen, where the computer is communicatively connected to a video conference management server.

A graphical user interface 210 comprising a directory service is provided. When the user accesses the directory service, the directory service may list a set of names 201 of user and/or names of video conferencing endpoints, thus providing the user with access to the names stored in a directory service database. The user may select (illustrated at 203) a user from the list, for example by clicking on the name using a mouse input device. As the user clicks on a name in the list, a lookup for that name is performed in the directory service database, and a geographical location value associated with that name is retrieved. If the video conferencing device is a local video conferencing endpoint, a geographical location value for the local video conferencing endpoint may also be retrieved. A visual representation of the smallest geographical entity containing all the geographical locations is displayed in the graphical user interface. In this example, the user is located in New York, and "Carl" is located in San Jose. A map of North America is displayed in the GUI, together with two graphical objects visualizing the current location of the two potential participants. In this example, the graphical objects are arrows pointing at the locations. The graphical objects, may also include a visual representation of the local time and the name of the location. Further, the arrow for San Jose could have been in a particular color, such as red, illustrating that the current time is outside Carl's normal working hours. The user may now choose to postpone the call, or proceed to call Carl by clicking on the "Call" button 204 in the GUI.

Figure 4:
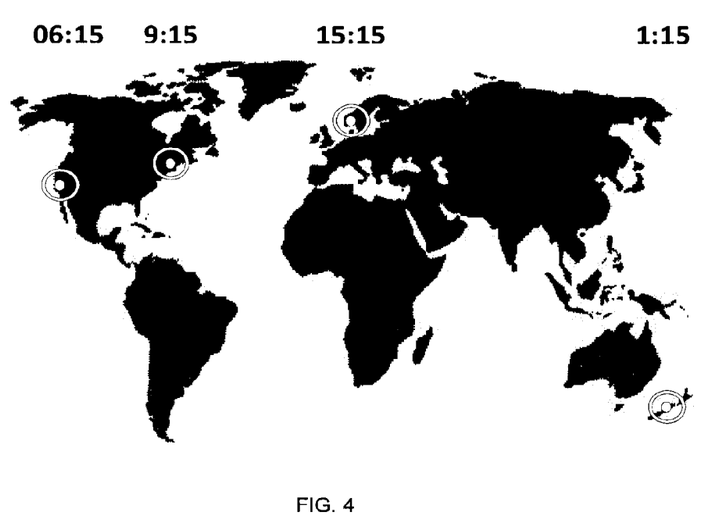
FIG. 4 illustrates a schematic block diagram of the result of the exemplary aspects of the disclosure.

FIG. 4 is a schematic block diagram illustrating principles of the result of the exemplary method. The figure illustrates an alternative way of displaying the graphical objects. A user in Norway has selected users located in west coast of USA, east coast of USA and New Zealand. It can easily be seen that west coast of USA and New Zealand is outside normal business hours, and the user may remove these sites from the call or reschedule at a more suitable time.

Figure 5:
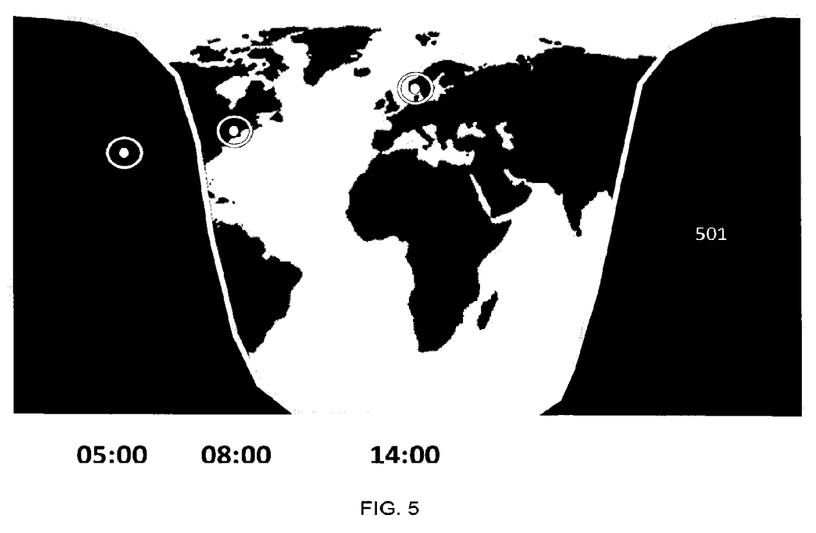
FIG. 5 illustrates a schematic block diagram of the result of other exemplary aspects of the disclosure.

FIG. 5 is a schematic block diagram illustrating additional principles of the result of the exemplary method. A graphical object 501 illustrating daylight information is displayed together with the visual representation of the earth.

The forgoing discussion merely described exemplary embodiments of the disclosure. As will be understood by one of ordinary skill in the art, the present disclosure may be embodied in other forms without departing from the spirit thereof. Accordingly, the disclosure is intended to be illustrative, but not limiting.

We claim:

1. A method comprising:
   receiving data indicative of a selection for scheduling a video conference from a first user, wherein the selection includes a designation of a second user;
   identifying a first geographic location associated with the first user;
   receiving presence data for the second user from a presence server in response to the selection for scheduling the video conference, wherein the presence data is based on activity of a mobile device of the second user;
   determining a second geographic location of the second user based on the presence data; and
   providing a map including the first geographic location and the second geographic location.

2. The method of claim 1, wherein the presence server is operable to measure activities of the second user at multiple devices.

3. The method of claim 1, wherein the presence server is operable to measure activities of the second user at multiple geographic locations.

4. A method comprising:
   receiving data indicative of a selection for scheduling a video conference from a first user, wherein the selection includes a designation of a second user;
   identifying a first geographic location associated with the first user;
   receiving presence data for the second user from a presence server;
   determining a second geographic location of the second user based on the presence data;
   providing a map including the first geographic location and the second geographic location;
   determining a first local time associated with the first geographic location;
   determining a second local time associated with the second geographic location;
   comparing the second local time to a time interval for normal business hours; and
   marking the second geographical location on the map dependent on whether the second local time is in the time interval.

5. The method of claim 1, further comprising:
   determining a first local time associated with the first geographic location;
   determining a second local time associated with the second geographic location; and
   displaying the first local time and the second local time on the map including the first geographic location and the second geographic location.

6. The method of claim 1, further comprising:
   comparing a local time associated with the first geographic location or the second geographic location to a time interval for normal business hours; and
   marking the first geographic location or the second geographical location on the map dependent on whether the local time is in the time interval.

7. The method of claim 6, further comprising:
   receiving a command to remove the second user when the second local time is outside of the time interval.

8. The method of claim 1, further comprising:
   calculating a smallest size for the map that encompasses the first geographic location and the second geographic location.

9. The method of claim 1, wherein the map is displayed during the video conference.

10. The method of claim 1, wherein the map is displayed on a video conference endpoint for scheduling the video conference.

11. The method of claim 1, further comprising:
    highlighting the second geographic location on the map with a marker or a visual adjustment of an area including the second geographic location.

12. The method of claim 1, further comprising:
    calculating a smallest geographical entity which encompasses the first geographic location and the second geographic location, wherein the map is based on the smallest geographical entity.

13. An apparatus comprising:
    a processor operable to:
       identify a first geographic location for a first user associated with a selection for scheduling a conference;
       determine a second geographic location from presence data for a second user from a presence server in response to the selection for scheduling the conference, wherein the second user is associated with the conference; and
       determine a map including the first geographic location and the second geographic location; and
    a display operable to display the map including the first geographic location and the second geographic location.

14. The apparatus of claim 13, wherein the presence server measures activities of the second user at multiple devices.

15. The apparatus of claim 13, the processor further operable to:
    determine a first local time associated with the first geographic location;
    determine a second local time associated with the second geographic location; and
    mark the first geographical location or the second geographical location on the map based on the a predetermined time interval.

16. An apparatus comprising:
    a processor operable to:
        identify a first geographic location for a first user associated with a selection for scheduling a conference;
        determine a second geographic location from presence data for a second user from a presence server, wherein the second user is associated with the conference; and
        determine a map including the first geographic location and the second geographic location;
        determine a first local time associated with the first geographic location;
        determine a second local time associated with the second geographic location;
        compare the second local time to a time interval for normal business hours; and
        mark the second geographical location on the map dependent on whether the second local time is in the time interval.

17. The apparatus of claim 13, wherein the processor is further operable to:
    calculate a smallest size for the map that encompasses the first geographic location and the second geographic location.

18. The apparatus of claim 13, wherein the map is displayed for scheduling the conference.

19. A non-transitory computer-readable medium storing computer readable instructions thereon, the computer-readable instructions, when executed by a computer cause the computer to perform a method for scheduling video conferences comprising:
    receiving data for scheduling a video conference from a first user, wherein the data includes a designation of a second user;
    identifying a first geographic location and a first local time associated with the first user;
    receiving presence data for the second user from a presence server in response to scheduling the video conference, wherein the presence data is based on activity of the second user;
    determining a second geographic location and a second local time of the second user based on the presence data; and
    providing a map including the first geographic location and the second geographic location, wherein the map indicates the first local time and the second local time.

20. The non-transitory computer-readable medium of claim 19, wherein a size of the map is selected as a function of the first geographic location and the second geographic location.

21. The method of claim 1, further comprising:
    comparing a time associated with the first geographic location or the second geographic location to a time interval; and
    marking the first geographic location or the second geographical location on the map dependent on whether the time is in the time interval.

22. The apparatus of claim 16, further comprising:
    a display operable to display the map including the first geographic location and the second geographic location.

* * * * *